No. 760,382. PATENTED MAY 17, 1904.
J. DAHLSTRÖM.
HORSESHOE MACHINE.
APPLICATION FILED JUNE 1, 1903.
NO MODEL. 9 SHEETS—SHEET 2.

No. 760,382. PATENTED MAY 17, 1904.
J. DAHLSTRÖM.
HORSESHOE MACHINE.
APPLICATION FILED JUNE 1, 1903.
NO MODEL. 9 SHEETS—SHEET 3.

WITNESSES
INVENTOR
John Dahlström

No. 760,382. PATENTED MAY 17, 1904.
J. DAHLSTRÖM.
HORSESHOE MACHINE.
APPLICATION FILED JUNE 1, 1903.
NO MODEL. 9 SHEETS—SHEET 5.

WITNESSES
INVENTOR

No. 760,382. PATENTED MAY 17, 1904.
J. DAHLSTRÖM.
HORSESHOE MACHINE.
APPLICATION FILED JUNE 1, 1903.
NO MODEL. 9 SHEETS—SHEET 6.
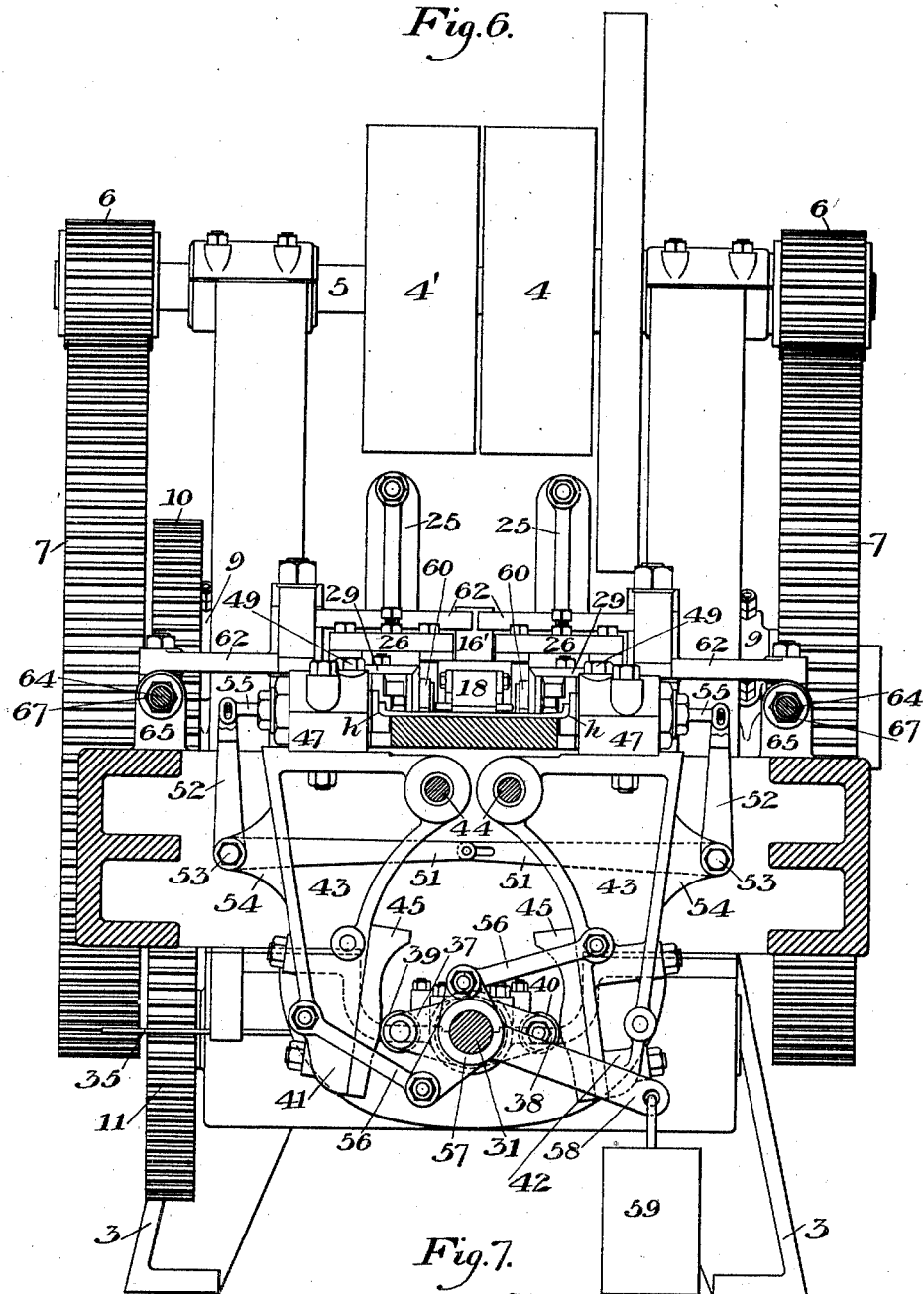
Fig. 6.
Fig. 7.
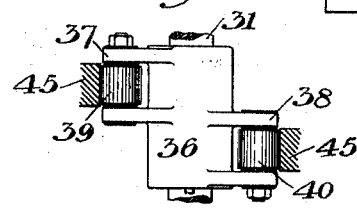
WITNESSES
Warren W. Swartz
H. M. Corwin
INVENTOR
John Dahlström
by Bakewell & Byrnes
his attys

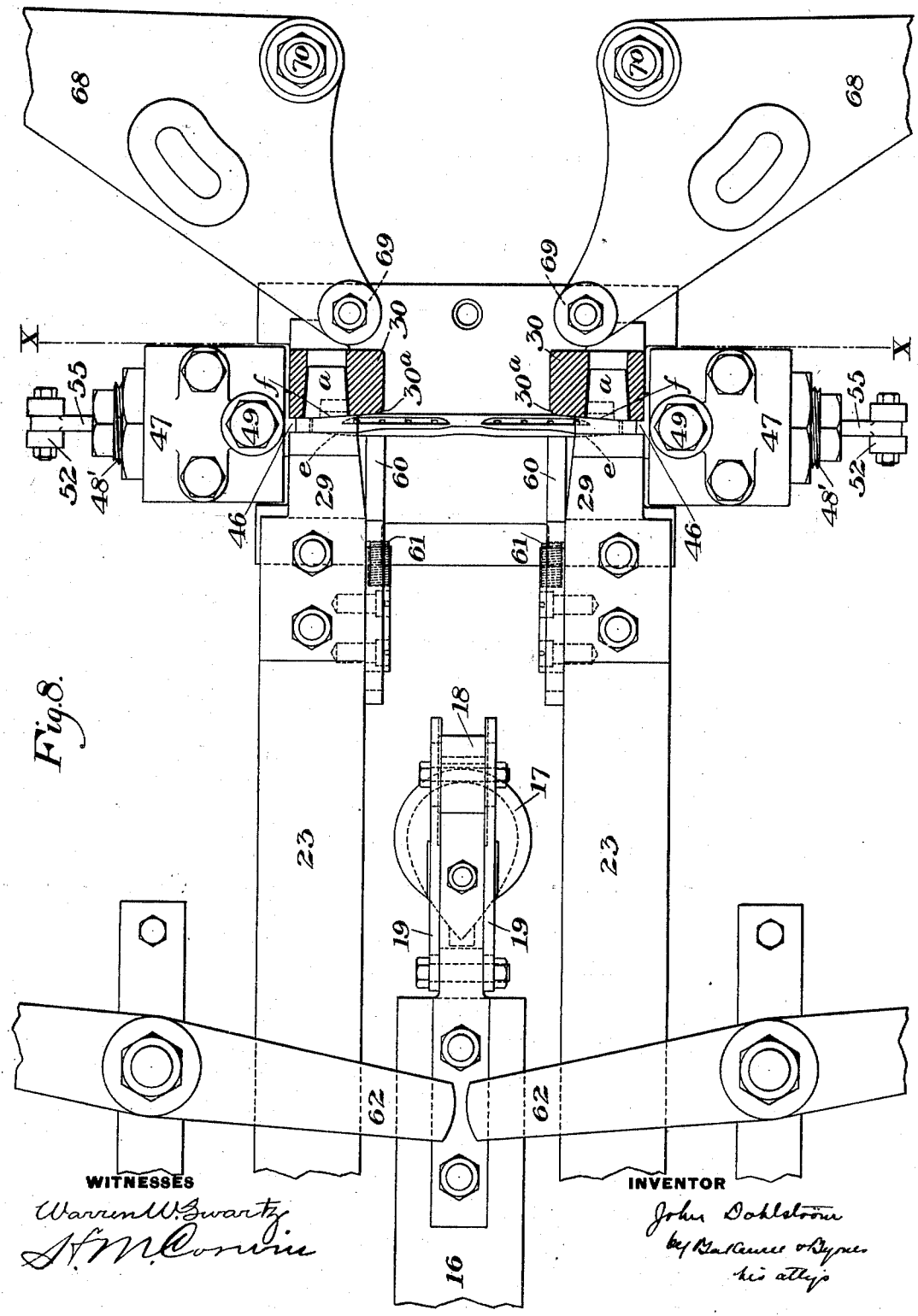

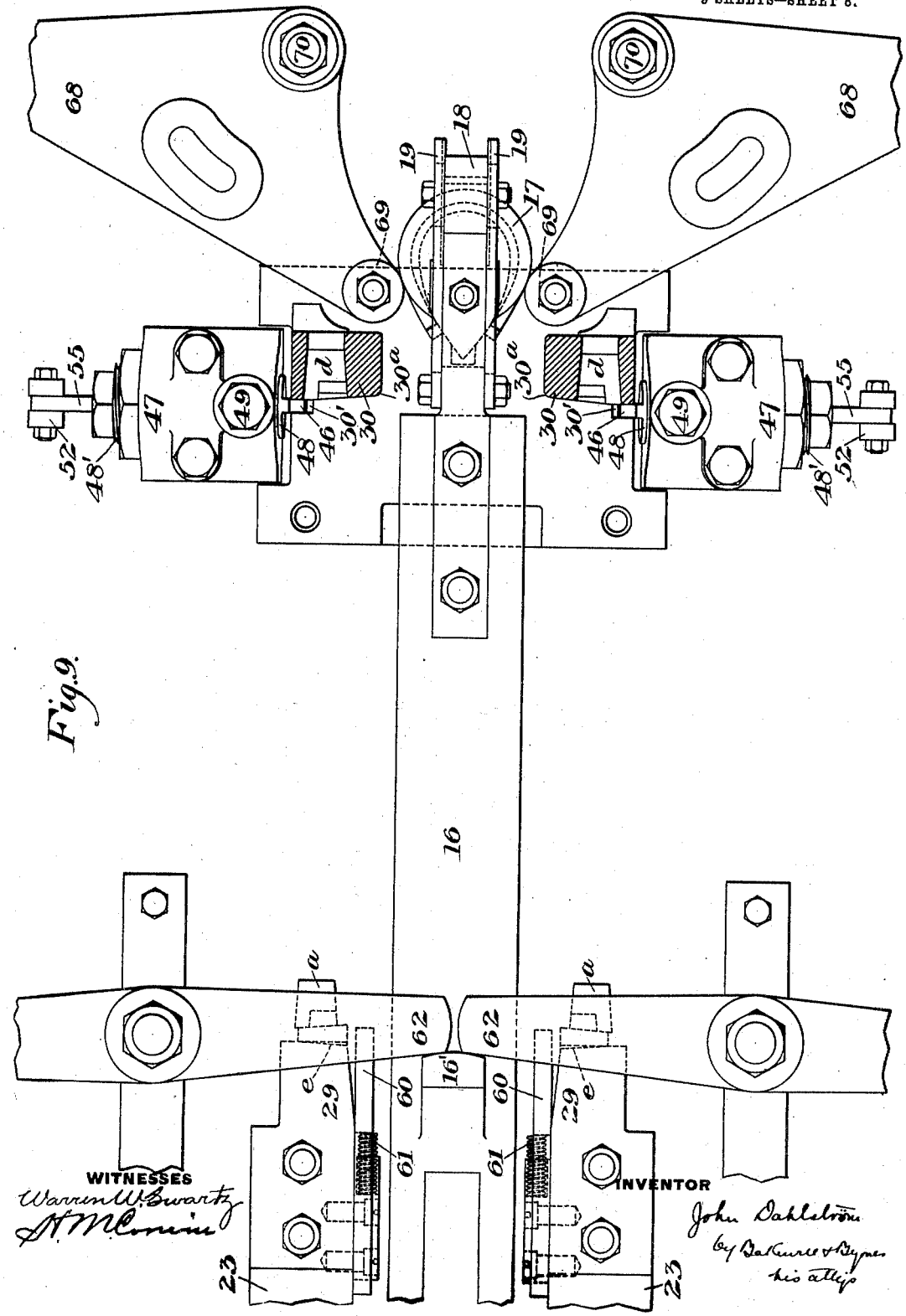

No. 760,382. PATENTED MAY 17, 1904.
J. DAHLSTRÖM.
HORSESHOE MACHINE.
APPLICATION FILED JUNE 1, 1903.
NO MODEL. 9 SHEETS—SHEET 9.
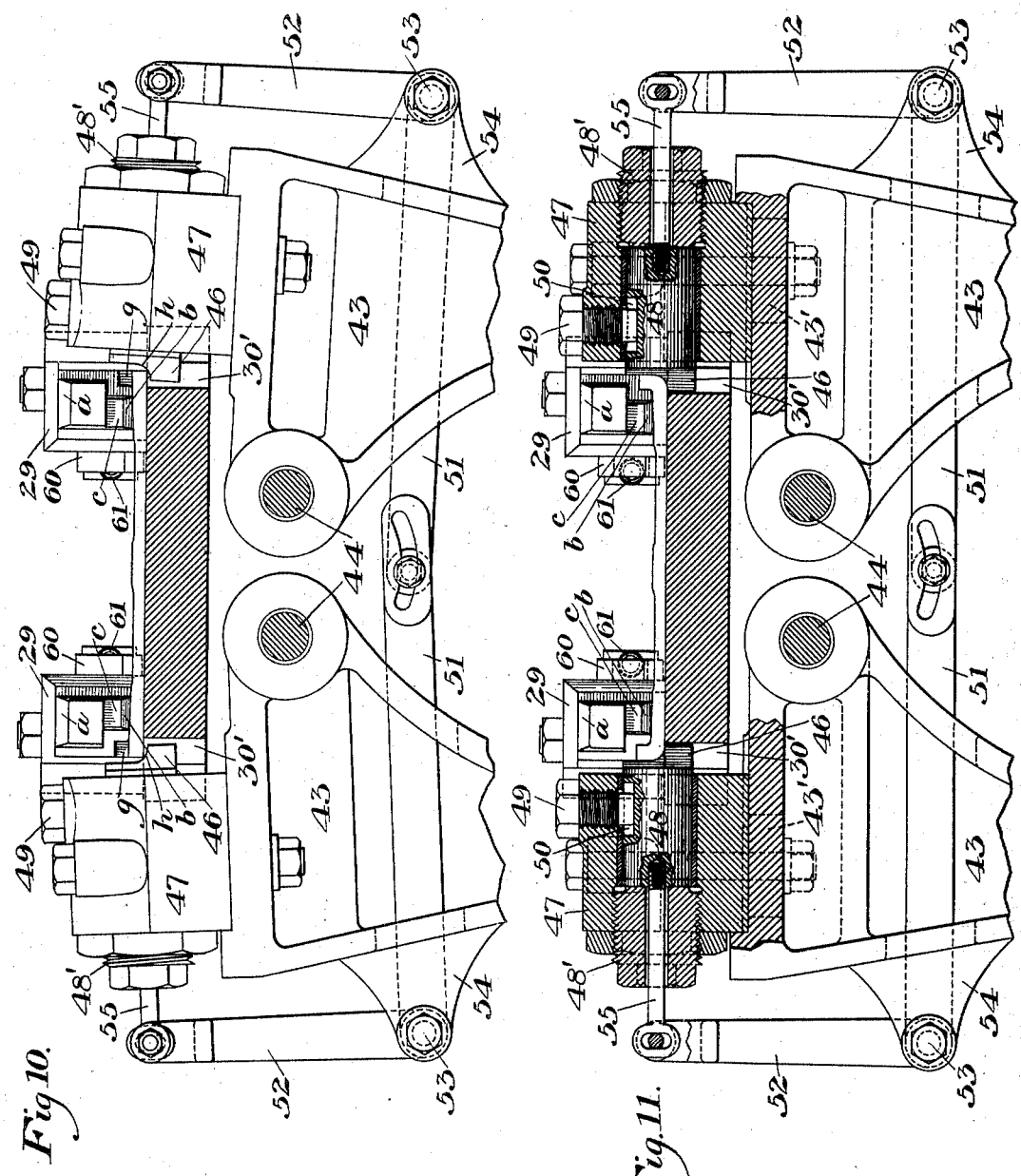
WITNESSES
Warren W. Swartz
H. W. Corwin
INVENTOR
John Dahlström
by Baldwin & Byrnes
his attys No. 760,382. Patented May 17, 1904.

UNITED STATES PATENT OFFICE.

JOHN DAHLSTRÖM, OF PITTSBURG, PENNSYLVANIA, ASSIGNOR TO THE AMERICAN STEEL AND WIRE COMPANY, A CORPORATION OF NEW JERSEY.

HORSESHOE-MACHINE.

SPECIFICATION forming part of Letters Patent No. 760,382, dated May 17, 1904.

Application filed June 1, 1903. Serial No. 159,478. (No model.)

*To all whom it may concern:*

Be it known that I, JOHN DAHLSTRÖM, of Pittsburg, Allegheny county, Pennsylvania, have invented a new and useful Horseshoe-Machine, of which the following is a full, clear, and exact description, reference being had to the accompanying drawings, forming part of this specification, in which—

Figure 1:
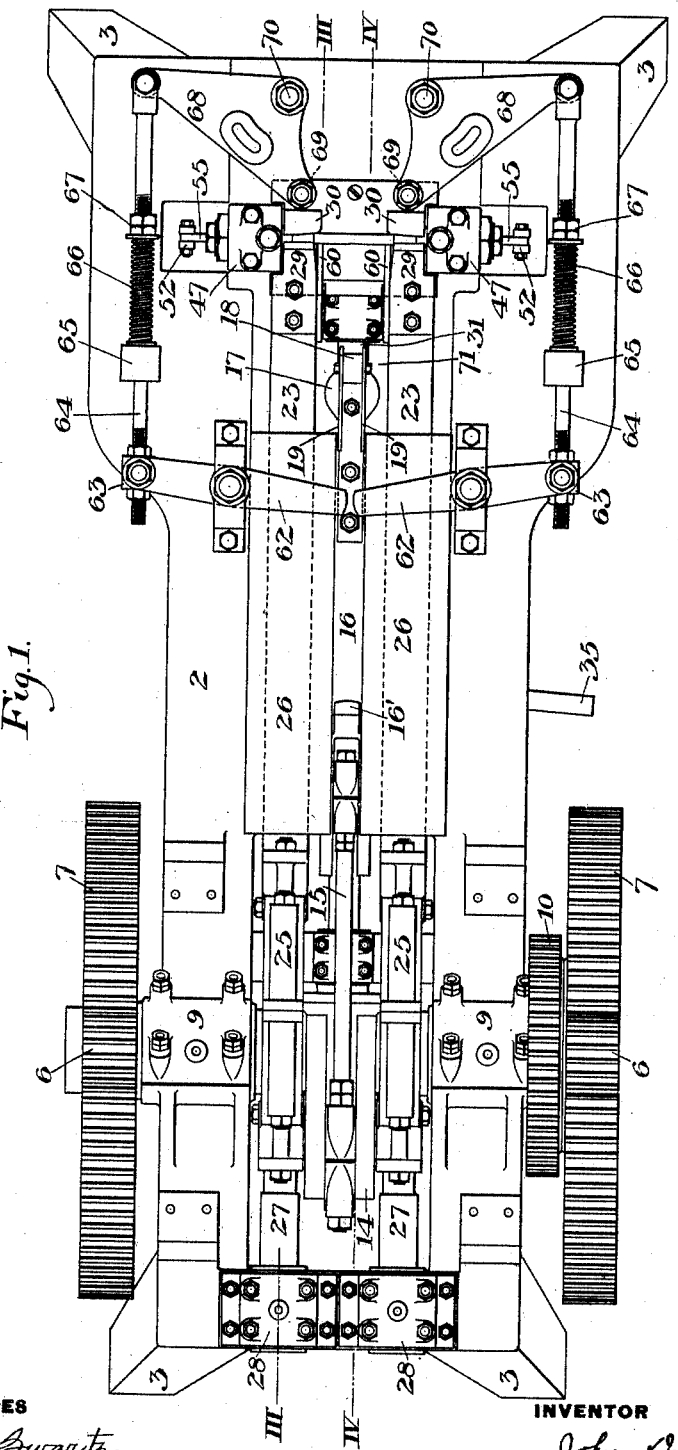
Figure 2:
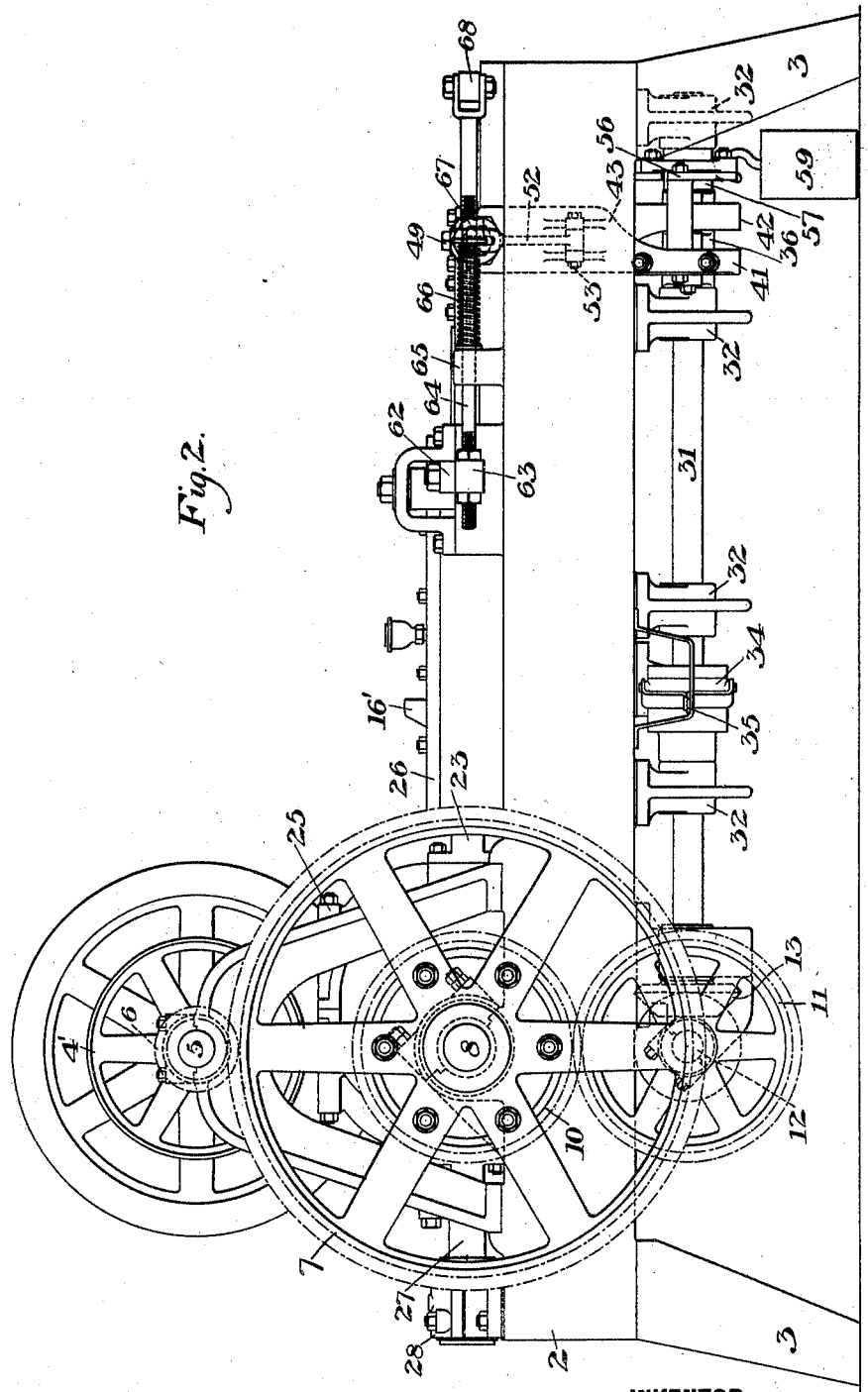
Figure 3:
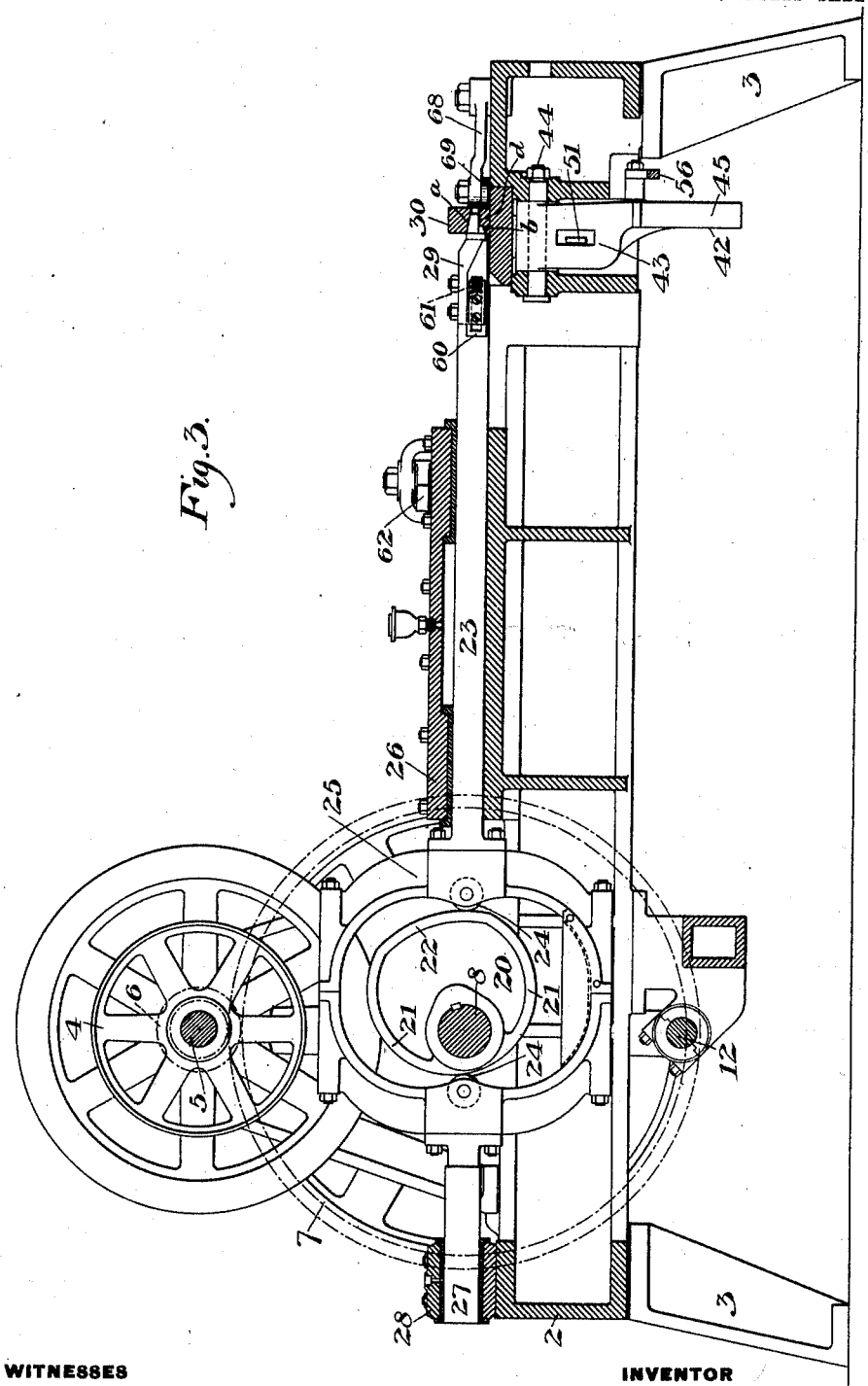
Figure 4:
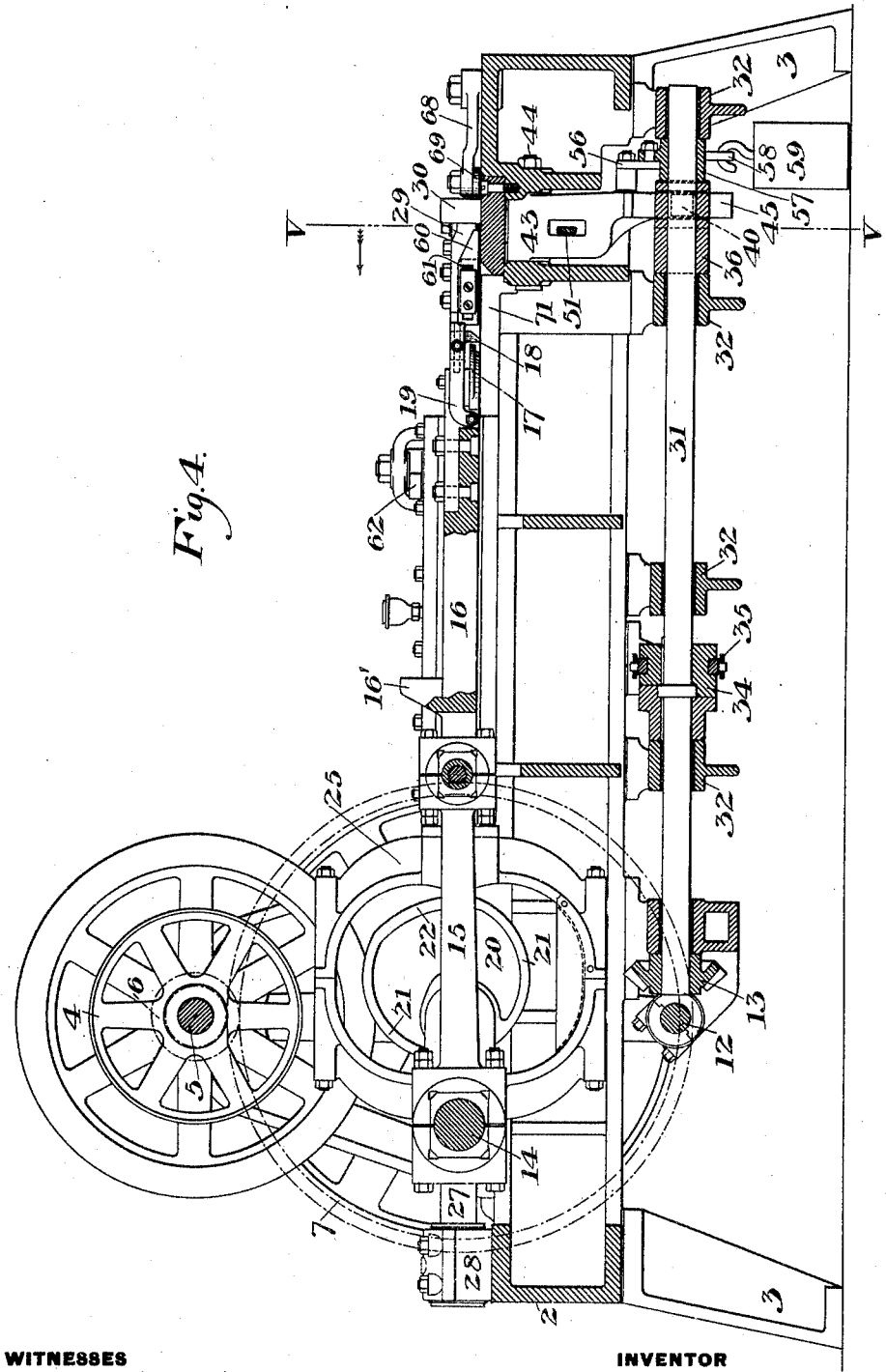
Figure 5:
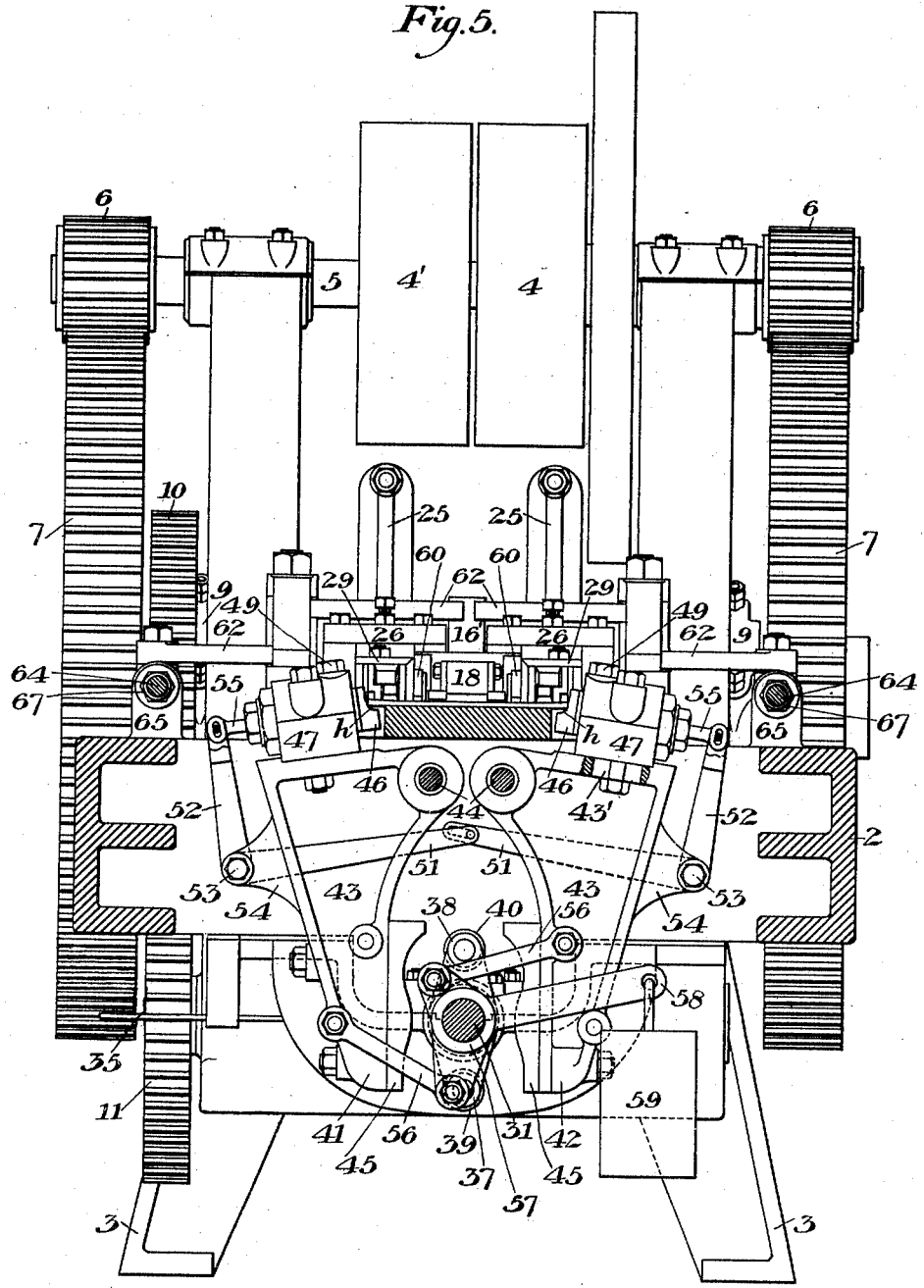

Figure 1 is a top plan view of the horseshoe-machine constructed in accordance with my invention. Fig. 2 is a side elevation of the same. Fig. 3 is a longitudinal section on the line III III of Fig. 1. Fig. 4 is a similar section on the line IV IV of Fig. 1. Fig. 5 is a cross-section, on a larger scale, the section being taken on the line V V of Fig. 4. Fig. 6 is a similar section showing the position of the parts when the heel-calks have been formed. Fig. 7 is a detail view of the calk-lever-actuating mechanism. Fig. 8 is a top plan view, on a larger scale, showing that portion of the machine in which the bar or piece is swaged, calked, and bent into final form, the parts being in the position they assume when the swaging operation has taken place. Fig. 9 is a view similar to Fig. 8, showing the parts in the position they assume when the shoe has been bent into final form. Fig. 10 is a cross-section on the line X X of Fig. 8, showing the blank in position ready to be calked; and Fig. 11 shows the position of the parts when the calks have been formed, the calking dies and levers being shown partly in section.

My invention relates to machines which are used in the manufacture of horseshoes, and is designed to provide a machine in which the heel-calks may be formed upon the blank without necessitating a separate handling operation or reheating of the blank.

My invention is further designed to improve the construction and operation of the various parts of the machine, so that uniformity may be obtained in the product of the machine due to the positive action of the various parts in performing the operations upon the blank from which the shoe is formed.

My invention is further designed to provide a machine in which several different sizes of shoes may be made and also to enable shoes either with or without heel-calks to be made upon the same machine.

In the drawings, 2 represents the bed-plate of the machine, which is supported upon the legs 3. Upon the bed-plate 2 are secured the bearings for the driving connections, which comprise tight and loose pulleys 4 4', mounted upon a shaft 5, said shaft being provided at its outer ends with pinions 6 6, and a suitable fly-wheel is preferably placed at an intermediate point. The pinions 6 6 engage larger gear-wheels 7 7 upon the outer ends of the main operating-shaft 8, which is mounted in suitable bearings 9 9 upon the bed-plate 2. Between one of the gears 7 and the bed-plate 2 is mounted a gear-wheel 10, which meshes with a similar wheel 11, mounted upon a shaft 12 beneath the bed-plate. This shaft is preferably provided with miter-gears 13, by which the calk-forming mechanism, hereinafter described, is operated. The main driving-shaft 8 is provided with a crank 14, preferably at its mid portion, to which a pitman 15 is connected at one end and which at its other end is connected to a sliding bar 16, which carries at its outer end a shoe-forming die 17 and the retracting-hook 18, by which the shoe is brought into the proper position to be discharged from the machine at the proper time. This hook is mounted on a pivoted arm 19, which permits it to pass through over the blank during its forward motion.

Upon either side of the pitman 15 and the crank 14 I secure cams 20, which have eccentric portions 21 and a concentric portion 22, the eccentric portion being adapted to impart a reciprocating motion to the swaging-bars 23 by engaging antifriction-rollers 24, mounted in the yokes 25, to which the swaging-bars 23 are secured. The swaging-bars 23 slide in suitable guides 26, and I preferably secure to the rear portion of the yokes 25 a rod 27, which slides in a guide 28, the guides 26 and 28 serving to hold the swaging-bars 23 and the rod 27 in proper position and alinement, so that the swaging-dies 29, secured to the forward ends of the swaging-bars, will register with the coacting female portion 30 of the swaging-dies. The male portions of the swaging-dies 29 are provided with a projecting nose having a downwardly-inclined portion $a$ on its upper face and a beveled portion $b$ on its lower face and a cut-away portion $c$ beneath the nose $a$ and in front of the beveled portion $b$, this cut-away portion $c$ fitting the lower portion $d$ of the cavity in the die 30 when the swaging-bars 23 have moved the swaging-dies 29 into their forward position. The die 30 is also provided with inclined portions which coact with the beveled faces $a$ and $b$ of the die 29. The nose of the die 29 is somewhat tapered on its sides to enable it to enter easily the tapered cavity in the female die portion 30. The under side of the die 29 immediately in the rear of the beveled portion $b$ is shaped so as to perform the swaging operation in conjunction with the front wall of the die 30 immediately below the opening into which the beveled portions $a$ and $b$ of the die 29 extend. The beveled surface $b$ serves to flatten the blank or piece which is to be formed into a shoe in case its end portions should not lie flat upon the bed-plate of the die, and the beveled face $a$, which coacts with a similar face on the female die-cavity, prevents any tendency of the swaging-bar to rise when acting upon the metal during the swaging operation. This causes the swaging action of the dies 29 and 30 to produce a uniform thickening of the stock to afford the necessary amount of material from which to form the heel-calks, the coacting faces of the swaging portion of the dies 29 and 30 being beveled, as shown at $e$ and $f$ in Fig. 8. A cut-out portion $g$ is provided into which the upturned portion of the blank is forced by the calking-dies, the action of which I shall presently describe. The parts being in the position shown in Figs. 1, 3, and 8, in which the swaging operation is shown as just taking place, it will be noted by reference to Fig. 3 that the concentric portion 22 of the cams 20 are in engagement with the forward rollers 24 and that so long as the concentric portion 22 is in engagement therewith the swaging-bars and the dies at their forward ends will remain in their extreme forward position. While the parts are in this position, the operation of forming the heel-calks takes place, and while the machine is running continuously the dead-point 22 on the cams 20 affords the necessary interval of time during which the calk-forming operation takes place. This calk-forming portion of the mechanism receives its operation through its gearing connection with the shaft 8, as previously described. One of the miter-wheels 13 is secured to a longitudinal shaft 31, mounted in suitable hangers 32, secured to the bed-plate of the machine. A clutch 34, comprising the usual tight and loose members, is mounted on the shaft 31 and is actuated by a lever 35, secured to the sliding member of the clutch. This clutch permits the machine to operate so as to form shoes with or without heel-calks. When the parts are in the positions shown in the drawings, Figs. 2 and 3, the calking mechanism is operatively connected. Near the forward end of the shaft 31 is keyed a sleeve 36, having arms 37 and 38, which are provided with rollers 39 and 40. The rollers 39 and 40 are not in line with each other, but are offset, as shown in Fig. 7, these rollers 39 and 40 engaging the depending end portions 41 and 42 of a pair of coacting calking-levers 43, which are pivoted at 44 to the bed-frame of the machine. These levers are provided with cam-faced shoes 45, secured to the inner sides of these levers, and these shoes are engaged by the rollers 39 and 40, the roller 39 acting upon the one secured to the end portion 41 and the roller 40 upon that at the lower end portion 42 of the calking-levers 43. The swaging-dies securely hold the swaged blank at their end portions, the base 30' of the die-blocks 30 being cut out, so as to afford the necessary space for the calking-dies 46 and to expose the under side of the swaged blank to the action of the calking-dies, the front faces of which are curved, as shown at $h$ in Figs. 5, 10, and 11. These dies are mounted in suitable guide-blocks 47, bolted to the upper face of the calking-levers 43, these levers being provided with slots 43', so as to afford adjustment to the die-blocks for the purpose of changing the size of the calks and to accommodate the varying lengths of the piece or blank from which the different sized shoes are formed. The dies 46 are preferably formed on the end of a cylindrical block 48, which is arranged to slide loosely within a suitable bushing secured within the die-blocks 47. A stop pin or screw 49 engages a groove 50 in the cylindrical block 48 and serves to hold the working face 46 of the die-block in proper position to engage the end of the blank or piece, and this pin at the same time serves to prevent the block 48 from being projected beyond the desired limit. These blocks 48 are loosely mounted within the die-carrying blocks 47 for the purpose of permitting the easy insertion of the blank or piece by the operator, since these blocks are free to move to permit the centering of the piece. The centering of the piece is accomplished by the levers 51 and 52, the levers 51 being loosely united at their inner ends and preferably extending in a substantially horizontal position, so that their weight is exerted upon the levers 52, which are connected to the same pin or shaft as the levers 51. This pin or shaft 53 is preferably mounted in lugs 54, formed upon the calking-levers 43, and the calking-levers are so shaped and cut away as to afford the necessary clearance for the passage of the levers 51, as shown in Figs. 3, 4, 10, and 11. The upper end of the levers 52 are forked so as to receive the end of a rod 55, which is loosely connected therewith and which is screwed into or otherwise secured to the blocks 48. These rods 55, together with the blocks 48, are normally projected forwardly, due to the weight of the levers 51; but should the pieces vary a little in length the parts readily adjust themselves and always bring the blank or piece from which the shoe is to be formed into proper position to be engaged at the proper point by the swaging-dies and also to insure a uniform amount of metal in the calk, which is bent by the working face of the die 46.

The calking-levers 43 are normally held with their lower ends 41 and 42 in the position shown in Fig. 5, and these levers are connected so as to move simultaneously by links 56, which are connected to a loosely-mounted sleeve 57 upon the shaft 31. This sleeve is provided with arms, to which the links 56 are attached, and an arm 58, to which a counterweight 59 is secured for the purpose of so balancing the calking-levers that when a piece is inserted the levers will swing freely to accommodate it and for the further purpose of assisting the bending and squeezing action of the dies 46 in forming the calks. In my machine the action of the calking-dies is first a bending and then a swaging action upon the ends of the swaged blank or piece, due to the location of the pivotal points 44 of the levers 43, the pivots being below the point where the calking-die first engages the end of the blank or piece and as near the center axis of the machine as possible, and while I have shown these levers as being pivoted upon separate pins it is possible by properly offsetting them to pivot them upon the same pin. The calking-die blocks 48 are each backed up by an adjustable plug 48', so that during the final swaging action to press the upturned portion of the blank into the cavity $g$ of the die 29 the die-block 48 abuts the plug 48', and the rollers 39 and 40 engage the high point of the cam-faces of the shoes 45 on the lower ends of the calking-levers 43 and force the dies toward each other during the latter position of their movement. As soon as the continued rotation of the shaft 31 moves the rollers 39 and 40 out of engagement with the high point of the cams just mentioned the rollers 24 pass off from the concentric portion of the cams 20, and the swaging-bars 23, carrying the swaging-dies 29, start rearwardly.

Secured to the inner side of the swaging-bars 23 are spring-pressed plates 60, which are normally held in projected position by a coil-spring 61; but these springs are put under compression when the plates 60 in the forward movement of the swaging-bars engage the blank or piece, as their forward end is somewhat in advance of that portion of the dies 29 which performs the swaging operation. These plates 60 act as strippers when the swaging-dies 29 start to withdraw from the front of the female portion 30 of the die and prevent the blank from being carried back with them, due to the sticking of the piece to the end of the dies, the expansion of the springs 61 maintaining the calked piece against the dies 30 for a sufficient period of time to enable the shoe-forming die 17 to engage it as it moves forwardly. The shoe-forming die 17, which is secured to the sliding bar 16, is advanced by the pitman 15, connected to the rear end and to the crank 14, and as the hook 18 moves in advance of the shoe-forming die 17 and is beveled on its front face and is pivotally connected to the bar 16 it passes freely over the blank or piece which has just been released by the swaging-dies themselves, but not as yet freed from the spring-pressed plate 60, the hook drops down, and the piece or bar having the calks formed thereon is now bent into U form, the rearward movement of the swaging-bars being rapid, owing to the point of the cam which is in engagement at this portion of the cycle of operations, thus affording the necessary space between the end of the swaging-dies 29 and the dies 30, between which the shoe-forming die moves forwardly, the dies 30 preventing the piece from moving endwise until it is bent into U form, at which time the shoe blank or piece is in condition to be acted upon by the bending-levers.

The bar 16 is provided with a horn or lug 16', which extends upwardly and is arranged to engage the inner ends of a pair of levers 62, which are pivotally mounted to the bed-plate of the machine. The outer ends of these levers are provided with adjustable connections 63, by which the levers are secured to rods 64, located on opposite sides of the machine. These rods slide in bearings 65 and are provided with coil-springs 66, which abut against the bearing 65 at one end and against an adjustable collar 67 at the other end, the rod being screw-threaded for the purpose of adjustment of the tension of the springs. These springs are normally expanded and hold the bending-levers 68 in the position shown in Figs. 1 and 8, their inner ends being provided, preferably, with rollers 69, arranged to act upon the heel portion of the shoe when the horn 16' is moved forwardly into the position shown in Fig. 9, the rods 64 moving rearwardly, due to the engagement of the horn 16' with the levers 62. This movement turns the bending-levers 68 upon pivots 70 and moves the rollers 69 inwardly, so that the shoe is bent into final form around the shoe-forming die 17, as shown in Fig. 9.

Starting with the parts in the position just described, in which a shoe has just been completed, the crank 14 is on the center in its extreme forward position, and the cams 20 are in the position in which the swaging-bars and dies are drawn back into their extreme rearward position, as shown in Fig. 9. The concentric portions of the cams 20 are in engagement with the rear rollers 24 of the yoke 25, and the swaging-dies do not immediately move forward, owing to this dead-point in the cam, and during the interval of time occupied by the concentric portion of the cam moving in contact with the roller 24 the swaging-dies are not advanced, but the newly-formed shoe is carried rearwardly for a portion of its travel before the swaging-bars and dies start forward. As this movement takes place the horn 16' leaves the levers 62 and the springs 66 expand and return the bending-levers 68 to their initial position. As soon as the end of the dead-point of the cams 20 is reached the swaging bars and dies start forward, and when the gap between the end of the hook 18 and the dies 30 is sufficiently great a heated blank or piece is laid in front of the dies 30 and between the ends of the calking-dies. The shoe-forming die continues to move rearwardly and releases the shoe, which drops by gravity through an opening 71 in the bed-plate 2 somewhat before the shoe-forming die has reached its extreme backward position. The swaging-bars during this movement have continued to advance, and the inclined portion $b$ passes freely over the piece or blank which has just been inserted, and the beveled portion $a$ of the nose of the swaging-die freely enters the cavity in the die 30. This beveled surface, as heretofore explained, prevents any tendency of the end of the swaging-bar and the die carried thereby to rise during the swaging operation, this operation being completed at the same time as the shoe-forming die reaches its extreme rearward position. The crank 14 is now upon the center at the opposite extreme. The swaging action has been completed and the parts are in the position shown in Figs. 1, 3, 4, and 8, and, as previously described, the swaging-dies will remain in their extreme forward position during the engagement of the concentric portion 22 of the cams 20 with the forward roller 24 on the yokes 25. The sleeve 36 on the shaft 31, which is driven by gearing from the same shaft that moves the swaging-bars, carries the rollers 39 and 40, which engage with the cam-shoes 45 on the calking-levers 46, and as the shaft 31 rotates the calking-levers are gradually separated, and turning upon their pivots 44, so as to impart, first, a bending and upsetting action upon the swaged ends of the piece or blank, the calking-dies enter the cut-out portion 30', and in their final position when the rollers 39 and 40 reach the high point of the cams 45 the calking-dies exert a squeezing or swaging action upon the bent portion of the blank or piece, which is forced into the cavity $g$ of the die 29. It will thus be seen that during the formation of the calks the piece is held against displacement by the faces of the dies 29 and 30, which swage the end of the piece, and by the under side $c$ of the projecting portion immediately in the rear of the bevel $b$, which engages the upper side of the piece or block, and the under side of the piece or blank is supported by the base-plate of the dies 30, except the end portions of the under side of the blank are left exposed, so that the calking-dies may act thereon and bend the calks while the piece is firmly held, these dies forcing the bent-up portion forming the calks into the recess $g$, provided on the under side of the dies 29 to give to the bent-up portion of the blank its finished shape. It is of great importance that the blank should thus be firmly held during this operation in order to secure a uniform amount of metal in the calks and an equal length to the bent portion of the blank forming the calks. I believe myself to be the first to form the calks while the unbent blank or piece is thus held against displacement and in the same heat in which the swaging and shoe-forming operations upon the blank or piece takes place. When the end of the dead-point of the cams 20 is reached and the swaging-dies start to recede, any tendency of the blank or piece to start rearwardly with them is prevented by the spring-pressed fingers 60, which continue to hold the piece against the dies 30 during the initial rearward movement of the swaging-dies. At this point in the movement of parts the calking-dies recede, and the counterweight is raised, thereby rendering the inward swing of the calking-levers easy and under perfect control. The swaging-dies continue to move rearwardly, and the shoe-forming die advances, and the hook 18 carried thereby first passes over the blank or piece and drops down, so as to confine it between the hook and the die 17. As soon as this engagement is completed the swaging-dies, which recede somewhat rapidly, due to the cam-action upon them, afford the necessary space, and the blank or piece is bent into U form, the heel portions being gradually brought toward each other as the die 17 passes between the inner faces $30^a$ of the dies 30.

The horn or lug upon the bar which carries the shoe-forming die when the latter is near the end of its forward movement engages the levers 62 and actuates the bending-levers 68, and the rollers 69 bend the shoe into final form around the forming-die. This completes the cycle of operation, which is repeated in forming each shoe.

The advantages of my invention result from the simplicity of construction and the directness with which the power is applied to the working parts and from the fact that I am enabled to dispense with delicate parts which are liable to break and get out of order, since by my construction the various parts of the mechanism may be made strong and durable.

Further advantages are derived from providing a machine in which the driving mechanism may revolve continuously and in the same direction and the use of cam mechanism which permits certain of the parts to remain at rest while other parts are in motion and a distinct operation to be made upon the piece during the period of rest, which period of rest at the proper interval ceases and the further movement of the parts proceeds, due to the continued rotation of the driving mechanism. This continuous operation of the parts in their proper sequence enables me to obtain a large output and to produce a finished shoe swaged, calked, and bent to final form in a single heat and with practically the same rapidity as has heretofore been obtained when only the swaging and bending operations have been attempted. The advantage of being able to form the calk before the shoe is bent to final form and in the same machine and with the same heat as that employed for the swaging and bending operations will be appreciated by those familiar with the difficulties heretofore encountered in performing this operation.

The advantage of bending the calks while the blank is confined and before bending into shoe form, as hereinbefore described, will also be apparent, since I am enabled to form calks which are uniform both as to their length and the amount of metal in them, a result which it is impossible to obtain when the calks are formed by hand after the shoe has been reheated or, if formed in a machine, after the swaging-dies have been released. By the use of my machine a perfectly uniform shoe is produced and there is no liability to distort the shape of the shoe in bending the heel-calks.

Further advantages of my invention result from the fact that I may make several different-sized shoes upon the machine, and, if desired, the machine may be used to make shoes in which no heel-calk is formed, this operation being entirely within the control of the operator.

Many variations may be made in the form and arrangement of the parts by the skilled mechanic without departing from the spirit and scope of my invention, since

What I claim is—

1. A horseshoe-machine having swaging-dies arranged to swage the ends of the straight blank, calking-dies, mechanism for actuating the swaging-dies arranged to hold them in swaging position for a predetermined interval of time, and mechanism for actuating the calking-dies while the blank is thus held by the swaging-dies; substantially as described.

2. A horseshoe-machine having calking-dies, forming-dies arranged to bend the blank into horseshoe form, and mechanism arranged to actuate the calking-dies to bend the calks, and thereafter actuate the forming-dies to bend the blank to horseshoe form; substantially as described.

3. A horseshoe-machine having swaging-dies, calking-dies, and dies arranged to bend the blank to horseshoe form, and actuating connections arranged to first actuate the swaging-dies, then the calking-dies, and thereafter the forming-dies to bend the blank to horseshoe form; substantially as described.

4. A horseshoe-machine having swaging-dies arranged to swage the ends of the unbent blank, calking-dies, and dies to bend the blank to horseshoe form, connections arranged to actuate the swaging-dies and hold them in swaging position a predetermined interval of time, connections arranged to actuate the calking-dies while the swaging-dies are holding the blank, and mechanism arranged to thereafter actuate the forming-dies to bend the blank to horseshoe form; substantially as described.

5. A horseshoe-machine having swaging-dies comprising stationary and movable members arranged to swage the ends of the straight blanks, mechanism arranged to reciprocate the movable members and to hold the same at rest after said swaging action is completed, calking-dies arranged to act upon the swaged ends of the piece, while so held, to form the calks, and forming-dies arranged to bend the blank to final form; substantially as described.

6. A horseshoe-machine having swaging-dies comprising stationary and movable members, cam mechanism arranged to actuate said movable members, said cam mechanism having a dead-point arranged to hold said movable members at rest during a portion of its revolution, and calking-dies arranged to act upon the end of the piece after the same has been swaged and while the movable members are at rest and the parts are in the swaging position; substantially as described.

7. A horseshoe-machine having swaging-dies comprising stationary and movable members, calking-dies arranged to coact therewith to center the piece before swaging, and to bend the calks after the swaging operation has taken place before the dies have separated, and mechanism for operating the movable swaging-dies and the calking-dies; substantially as described.

8. A horseshoe-machine having swaging-dies comprising stationary and movable members, calking-dies arranged to coact therewith to center the piece before swaging, and to bend the calks after the swaging operation has taken place before the dies have separated, and continuously-rotating mechanism for operating the movable swaging-dies and the calking-dies; substantially as described.

9. A horseshoe-machine having swaging-dies arranged to swage and grip the piece, and calking-dies arranged to act upon the swaged ends of the piece while held between the swaging-dies, said calking-dies arranged to swing upon a fixed center so as to impart a bending and swaging action in forming the calk; substantially as described.

10. A horseshoe-machine having calking-dies arranged to act upon the swaged ends of a blank, means for gripping the blank, said calking-dies being carried upon pivoted members whose centers of motion are located in proximity to each other so as to impart during the first portion of their movement a bending action and an upsetting action, and upon their further movement a squeezing or swaging action during their continued movement toward each other, and means by which said motion is imparted to the members carrying said calking-dies; substantially as described.

11. A horseshoe-machine having swaging-dies, mechanism for operating the same, calking-dies and actuating mechanism therefor, shoe-forming dies and means for operating the same, bending mechanism arranged to give the shoe its final form, constantly-rotating driving mechanism for imparting motion to the swaging, calking, shaping and bending mechanism, and a clutch arranged to disconnect the calking mechanism without affecting the other operations upon the piece from which the shoe is formed, the operator thus controlling the calking operation at will; substantially as described.

12. A horseshoe-machine having calking-dies, pivoted members whose centers of motion are located in proximity to each other, actuating mechanism arranged to engage said pivoted members so as to impart movement to the calking-dies and connections between the levers by which they are simultaneously operated, and counterbalancing mechanism connecting both members for controlling their inward swing and proper balance, and actuating mechanism by which said levers and calking-dies are operated; substantially as described.

13. A horseshoe-machine having calking-dies carried upon pivoted members, said dies being capable of endwise movement independent of their pivoted support, mechanism carried thereby by which said calking-dies are normally projected toward each other and by which the piece to be operated upon is centered, swaging-dies arranged to operate upon the piece thus centered and to grip the same while said calking-dies are acting upon the swaged ends of the piece, the pivoted members carrying the calking-dies being actuated by a continuously-rotating element and their pivotal points being such as to impart during the first portion of their movement a bending action, and upon their further movement, a squeezing action upon the end portion of the blank from which the calk is formed; substantially as described.

In testimony whereof I have hereunto set my hand.

JOHN DAHLSTRÖM.

Witnesses:
  JOHN MILLER,
  H. M. CORWIN.